United States Patent
Vidya Sagar

(12) United States Patent    (10) Patent No.: US 7,698,347 B2
Vidya Sagar    (45) Date of Patent: Apr. 13, 2010

(54) SYSTEM AND METHOD FOR SHORTENING CLICK URLS

(75) Inventor: Vikram Raj Vidya Sagar, Valley Village, CA (US)

(73) Assignee: Yahoo! Inc., Sunnyvale, CA (US)

( * ) Notice: Subject to any disclaimer, the term of this patent is extended or adjusted under 35 U.S.C. 154(b) by 205 days.

(21) Appl. No.: 11/506,337

(22) Filed: Aug. 18, 2006

(65) Prior Publication Data
US 2007/0043879 A1    Feb. 22, 2007

Related U.S. Application Data

(60) Provisional application No. 60/710,036, filed on Aug. 18, 2005.

(51) Int. Cl.
*G06F 17/30* (2006.01)
*G06F 17/00* (2006.01)

(52) U.S. Cl. ................ 707/782; 709/217

(58) Field of Classification Search .............. None
See application file for complete search history.

(56) References Cited

U.S. PATENT DOCUMENTS

| | | | |
|---|---|---|---|
| 6,957,224 B1* | 10/2005 | Megiddo et al. ............. 707/102 |
| 7,143,143 B1* | 11/2006 | Thompson .................. 709/217 |
| 2002/0029290 A1* | 3/2002 | Burema et al. ............. 709/238 |
| 2003/0014331 A1* | 1/2003 | Simons .................... 705/27 |
| 2003/0046361 A1* | 3/2003 | Kirsch et al. ............. 709/217 |
| 2004/0248558 A1* | 12/2004 | Chandhok ................ 455/412.1 |
| 2005/0038861 A1* | 2/2005 | Lynn et al. .............. 709/206 |

OTHER PUBLICATIONS

Notes, Greg. "Unlocking URLs: Extensions, Shortening Options, and Other Oddities". May 29, 2003. <http://web.archiye.org/web/20030529072906/http://www.infotoday.com/online/may03/OnTheNet.shtml> which teaches on shortening uniform resource locators.*

* cited by examiner

*Primary Examiner*—James Trujillo
*Assistant Examiner*—Dawaune Conyers
(74) *Attorney, Agent, or Firm*—Seth H. Ostrow; Ostrow Kaufman & Frankl LLP

(57) ABSTRACT

The present invention is directed to a system and method for reducing the size of one or more keys encoded into a link to a target resource. The method of one embodiment comprises receiving a request for a target resource, encoding a link to the target resource with one or more key/value pairs and selecting a given key/value pair from among the one or more key/value pairs to identify a key. The key is located in a key map to identify a substitute key, which replaces the key in the link.

11 Claims, 4 Drawing Sheets

SYSTEM AND METHOD FOR SHORTENING CLICK URLS

The present application claims the benefit of U.S. Provisional Patent Application No. 60/710,036, entitled "SYSTEM AND METHOD FOR SHORTENING CLICK URLS," filed Aug. 18, 2005, the disclosure of which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

FIELD OF THE INVENTION

Embodiments of the present invention relate to data compression. More specifically, embodiments of the present invention are directed towards systems and methods for compressing the size of one or more keys encoded as parameters within a uniform resource locator ("URL").

BACKGROUND OF THE INVENTION

Information producers and consumer exchange content items (e.g., web pages) in networked environments, such as over the Internet. When exchanging content items, it is useful to encode information into a link to a given content item such that an information producer, such as an advertiser, may obtain information regarding the request or selection of the given content item by an information consumer, such as a user of a personal computer browsing web pages on the Internet. Information producers, or a third party serving a content item that an information producer creates, may encode information to track the utilization of the content item. The process of encoding information into a link to a given content obviates the need to execute time consuming database lookups for every client action; information is retrieved from a database once and then encoded into the link to make the information available.

Information encoded into a link for a given content item, however, has become an unwieldy process due to the large amount of information encoded into such links. Accordingly, there is a need for systems and methods that reduce the size or amount of information encoded into a link to a given content item without eliminating an substantive information encoded into a give link.

SUMMARY OF THE INVENTION

Embodiments of the present invention are directed towards systems and methods for reducing the size of one or more keys that may be encoded in to a link to a target resource. The method according to one embodiment comprises receiving a request for resources pertaining to a given keyword. Candidate target resources are encoded into one or more hyperlinks along with one or more key/value pairs. A given key/value pair is selected from among the one or more key/value pairs to identify a key, which is located in a key map to identify a substitute key and replaced with the substitute key. Receiving the request may comprise receiving the request from an affiliate, to which encoded links may be transmitted and encoding the link may comprise encoding a URL. Transmitting may comprise transmitting the links from the affiliate to a client.

According to one embodiment, encoding the link comprises identifying an address for a result click server, which may comprise identifying a URL for the result click server. A user may select the link that identifies the target resource, accessing a result click server identified in the link, locating the substitute key in the key map to identify the original key and replacing the substitute key in the link with the original key.

The invention is also directed to a system for reducing the size of one or more keys encoded into a link to a target resource. According to one embodiment, the system comprises an affiliate server operative to receive a request for one or more target resources, encode a link to the target resource with one or more key/value pairs, select a given key value pair from among the one or ore key/value pairs to identify a key, locate the key in a key map to identify a substitute key and replace the key with the substitute key. The affiliate server may be further operative to receive the request from an affiliate server and transmit the link to the affiliate server, wherein the affiliate server may be operative to transmit the link to the client. Furthermore, embodiments contemplate the link comprising a URL that identifies an address for a target resource, which may comprise an advertisement for a product or service.

The affiliate server may be operative to encode the link with an address for a result click server, which may comprise a URL. According to one embodiment, the result click server is operative to receive a request indicating selection of the link by a client, locate a substitute key from the link in the key map to identify the key and replace the substitute key with the key.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
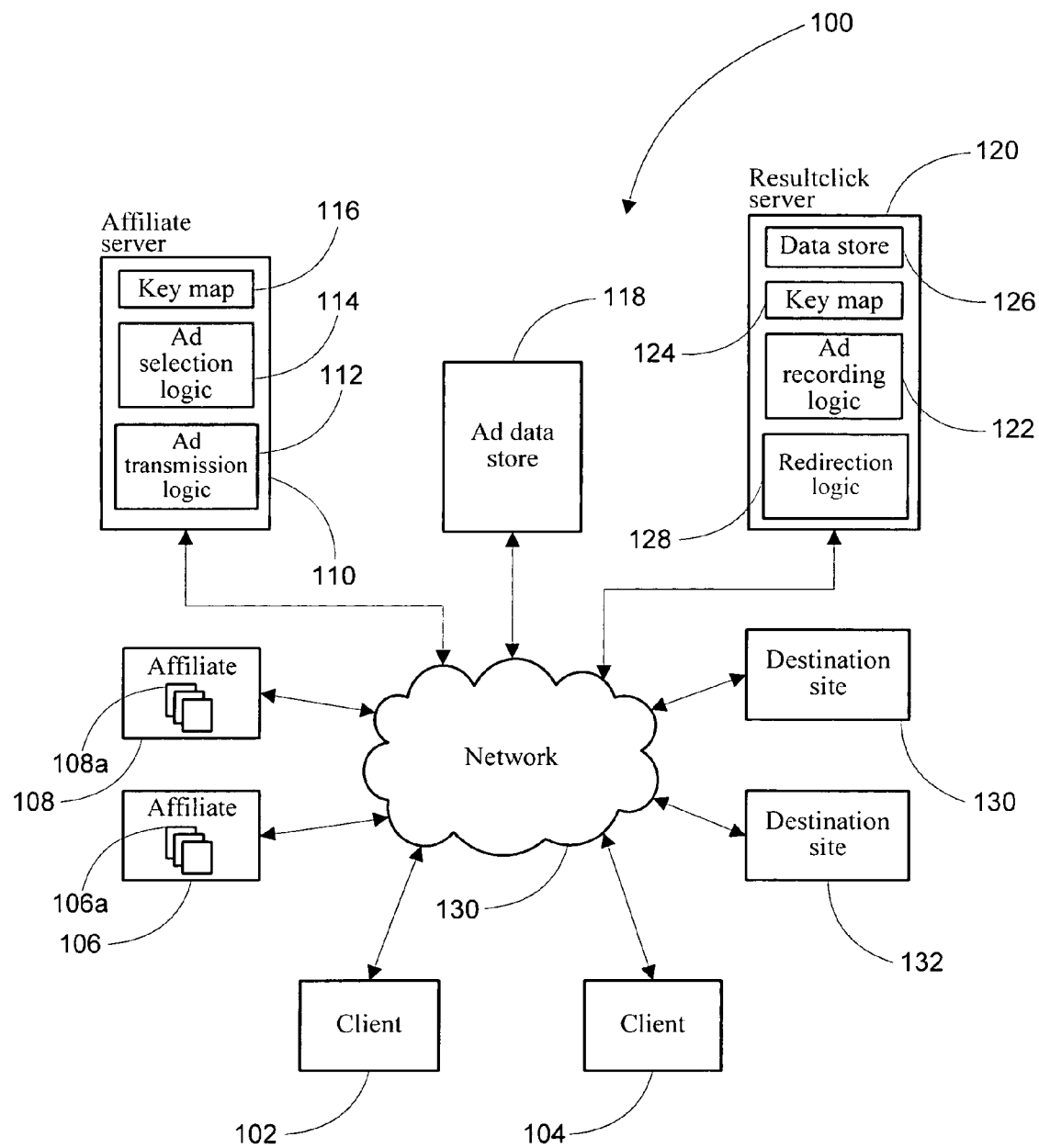
FIG. 1 is a block diagram presenting a system for compressing key/value pairs encoded into a URL according to one embodiment of the present invention.

FIG. 1 is a block diagram illustrating one embodiment of a system for reducing the size of one or more key/value pairs encoded into a link, such as a URL. One or more client devices 102 and 104 are coupled to and in communication with a network 130. A user interacts with a client 102 and 104. Client device may be a personal computer of the type that is well known to those of skill in the art and may include (not pictured) a processor, transient memory (e.g., RAM), persistent memory (e.g., hard drive), input device (e.g., mouse and keyboard) and circuitry to provide communication paths between the components. An exemplary personal computer is a Dell Dimension 3000 that comprises a 2.8 GHz Intel Pentium 4 Processor, the Microsoft Windows XP operating system, 256 MB of RAM and a 40 GB hard drive, keyboard, mouse, monitor, and Ethernet network interface. Other clients include, but are not limited to, PDAs, cellular devices, thin clients, etc.

A given client device 102 and 104 may comprise network interface hardware and software that provides the client with the ability to transmit and receive data over the network 130. The network 108 may be a local area network, a wide area network, or combinations thereof, e.g., the Internet, and provide communication channels between the clients 102 and 104, affiliates 106 and 108 and destination sites 130 and 132, as well as other components of the system 100.

A memory device on the client (not pictured), which may be a persistent or transient storage device, provides storage for one or more client applications. One application the client runs is an operating system that provides a high level user interface as well as low-level input/output control and memory management for the client 102 and 104. As discussed above, Microsoft Windows XP is one exemplary operating system where the client is a personal computer. Other operating systems are contemplated by the invention as is appropriate for the client device that the user is employing, e.g., the Symbian 60 and Windows Mobile operating systems deployed on some portable cellular devices. Regardless of the operating system, the client maintains an application program 104a, 104b, 104c, 104d and 104e that provides and interface for browsing content made available by one or more content servers 106a and 106b. Affiliates (106 and 108) and destination sites (130 and 132) comprise similar components and structures, in addition to server specific components and structures that are well know to those of skill in the art.

An exemplary given affiliate 106 and 108 provides one or more pages, 106a and 108a, respectively, related through the use of hyperlinks, such as links formatted as URLs. Generally an affiliate server is any digital media source that may receive requests for candidate advertisements, which the affiliate server provides to a client 102 and 104 through affiliate 106 and 108. When a client 102 and 104 accesses a given affiliate 106 and 108 to retrieve an item of digital media, such as a web page, the affiliate 106 and 108 requests an advertisement from an affiliate server 110, which provides the affiliate 106 and 108 with one or more candidate advertisements that the affiliate server 110 selects from an advertisement data store 118. For example, assume that the affiliate is the Yahoo! Search Engine. When a user utilizes a web browser operating on a client device to access the Yahoo! Search Engine, the search engine communicates with an affiliate server 110 to request and retrieve candidate advertisements for presentation to the user in conjunction with a search result set.

According to one embodiment, the affiliate server 110 comprises advertisement transmission logic 112, advertisement selection logic 114 and one or more key maps 116. When the affiliate server 110 receives a request from an affiliate 106 and 108, advertisement selection logic at the affiliate server 110 is operative to access the advertisement data store 118 to select an advertisement for transmission to the affiliate 106 and 108. The request that the affiliate server 110 receives from a given affiliate may comprise a number of items of information regarding the request. Exemplary information that may be comprise a request from a given affiliate may include, but is not limited to, the identity of or other information regarding the affiliate 106 and 108, information regarding the item of digital media or content that client 102 and 104 is requesting, the identity of or other information regarding the client 102 and 104, location information, etc. The advertisement transmission logic 112 may utilize information from the request to select an advertisement to provide to the affiliate 106 and 108. Systems and methods for the selection of an advertisement, which may be embodied by the advertisement selection logic 114, are described in U.S. patent Ser. No. 11/324,129, entitled "SYSTEM AND METHOD FOR ADVERTISEMENT MANAGEMENT," filed on Dec. 30, 2005, the disclosure of which is incorporated herein by reference in its entirety.

In addition to selecting advertisements, the advertisement selection logic 112 may also encode data into a link to the advertisement that it selects. Information that the advertisement selection logic 112 encodes into the link may include, but is not limited to, information in the request that the affiliate server 110 receives from a given affiliate 106 and 108 and information regarding the advertisement. The information that the affiliate server encodes into the link may also comprise an address for a resultclick sever 120 and a redirection address. The affiliate server 110 may encode these items of information into the link as one or more key/value pairs whereby the key identifies an item of encoded information and the value identifies a value for the item, e.g., assuming the key/value pair "market=North America", the key is "market" and the value is "North America".

As indicated above, the number of key/value pairs encoded into a link to a content item, such as a URL to a web page, as well as the size of the key/value pairs, may become cumbersome. The advertisement selection logic 114 utilizes a key map 116 to reduce key size and therefore the size of a link to a given content item. According to one embodiment, the key map 116 comprises a table that maps keys to substitute keys. Advantageously, a substitute key is shorter in length than a corresponding key such that the substitute key/value pair requires less space than the key/value pair. The advertisement selection logic 114 may utilize the mapping of keys to substitute key in the key map 116 to replace one or more keys encoded in the link with corresponding substitute keys.

The advertisement selection logic 114 passes the encoded link for the advertisement from the advertisement data store 118 to the advertisement transmission logic for transmission to the requesting affiliate 106 and 108. As an alternative to the foregoing embodiment, the advertisement transmission logic 112 may encode the address of a resultclick server 120 into the link, such that the client accesses the resultclick server upon selection of the link. Furthermore, the advertisement transmission logic 112 may utilize the key map to replace the key associated with the address of the resultclick server with a substitute key. The advertisement transmission logic 112 transmits the encoded link over the network 130 to the affiliate 106 and 108. The affiliate 106 and 108 incorporates the link into the content item 106a and 106b that it returns over the network 130 to the client 102 and 104. For example, the client 102 and 104 may render the link as a sponsored listing that the client 102 and 104 displays in conjunction with one or more content items 106a and 106b that the affiliate 106 and 108 provides.

When the client 102 and 104 selects the link for the advertisement, the client 102 and 104 utilized the network 130 to accesses the address of a resultclick server that the affiliate server 110 encodes into the link. The resultclick server is operative to collect information regarding the client, 102 and 104, the affiliate and the advertisement or advertiser providing the advertisement. The collection of such information allows for reconciliation of payments from an advertiser to an affiliate for display of the advertisement that the client 102 and 104 selects. The provider of the affiliate server 110 and resultclick server 120 may also collect a percentage or fixed amount from the transaction as a cost of utilizing the system 100.

When the resultclick sever 120 receives a request from the client indicating selection of the link by the client 102 and 104, the resultclick server 120 passes the request to advertisement recording logic 122. Advertisement recording logic 122 may extract one or more substitute key/value pairs from the request that the affiliate server 110 encoded into the link. The advertisement recording logic 122 selects a given substitute key and utilizes a key map 124 (which may be identical to the key map that the affiliate server 100 utilizes) to identify a key that corresponds to the given substitute key, replacing the substitute key with the corresponding key. The advertisement recording logic 122 writes the key/value pair (with or without further processing) to a data store 120, which may be flat file database, a comma separated value ("CSV") database, a relational database, an object oriented database, a hybrid object-relational database, etc. The information that the advertisement recording logic 122 writes to the data store 120 is available for accounting or other processing.

The advertisement selection logic 122 passes the request that it receives from the client to redirection logic 128. The redirection logic 128 redirects the client 102 and 104 to a given destination site 130 and 132 that provides access to information regarding the product or service that the link identifies. In response, the destination site 130 and 132 provides data to the requesting client 102 and 104, e.g., for rendering in a browser executing at the client.

It should be noted by those of skill in the art that the various programming languages and frameworks known to those of skill in the art may be utilized to instantiate the programming logic heretofore described. It should be further noted that although the illustration of the exemplary embodiment of FIG. 1 indicates certain divisions in programming logic and the placement thereof, these divisions are logical and not intended to be limiting, e.g., components of the present invention may be distributed or consolidated over one or more network resources.

Figure 2:
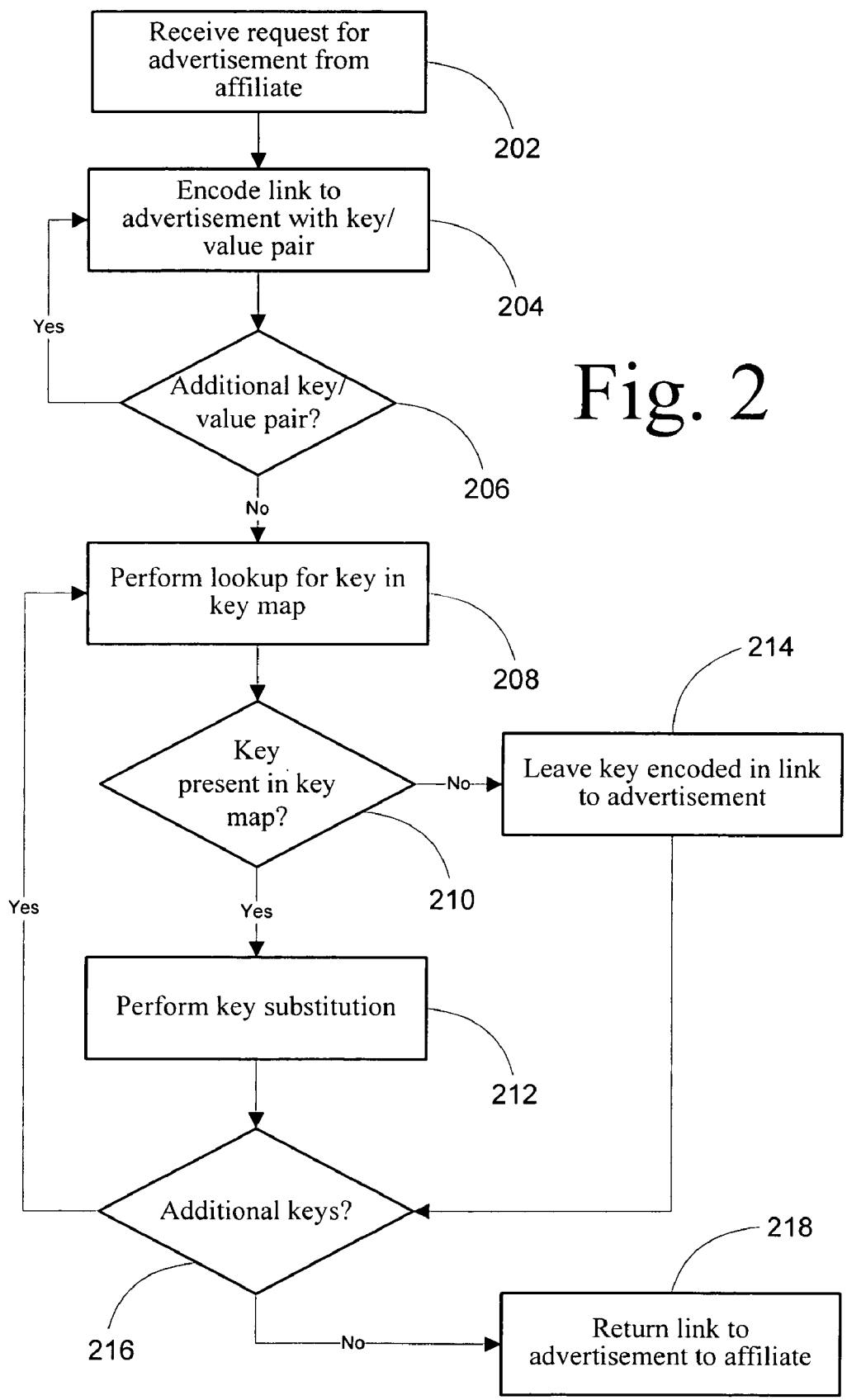
FIG. 2 is a flow diagram illustrating a process for compressing the size of one or more keys encoded into a URL according to one embodiment of the present invention.

One embodiment of method for reducing the size of keys encoded into a link to a content item is illustrated in the flow diagram of FIG. 2. According to one embodiment, the process begins with the receipt of a request for an advertisement from an affiliate, step 202. The receipt of the request causes the selection of a set of one or more candidate advertisements that is responsive to the request, for example, the selection of one or more advertisements that are a match with one or more keywords or other information in the request. A link to the advertisement is encoded with a key/value pair, step 204, for example, an identifier for the affiliate may be encoded into the link to ensure that the affiliate is compensated for display or selection of the link. A server encoding the link performs a check to determine if an additional key/value pair exists for encoding into the link, step 206. Where the check evaluates to true, processing returns to step 204 with the encoding of a subsequent key/value pair into the link.

A server performs a lookup in a key map for a given key encoded into the link, step 208, and also performs in check to determine if the key is present in the key map, step 210. Where the given key is not present in the key map, step 210, the server leaves the key encoded into the link for the advertisement, step 214. Where the key is present in the key map, step 210, the server performs the replacement of the key in the link with a substitute key from the key may that corresponds to the key, step 212. Regardless of the result of the check, step 210, the server performs a check to determine if additional keys are present in the link, step 216. If so, processing returns to step 208 with the selection of a subsequent key for lookup in the key map. Otherwise, the server returns the link to the advertisement encoded with one or more substitute key/value pairs, to the affiliate, step 218, which may include adding one more keys to indicate that compression was performed in accordance with the key-map method of the present invention.

Figure 3:
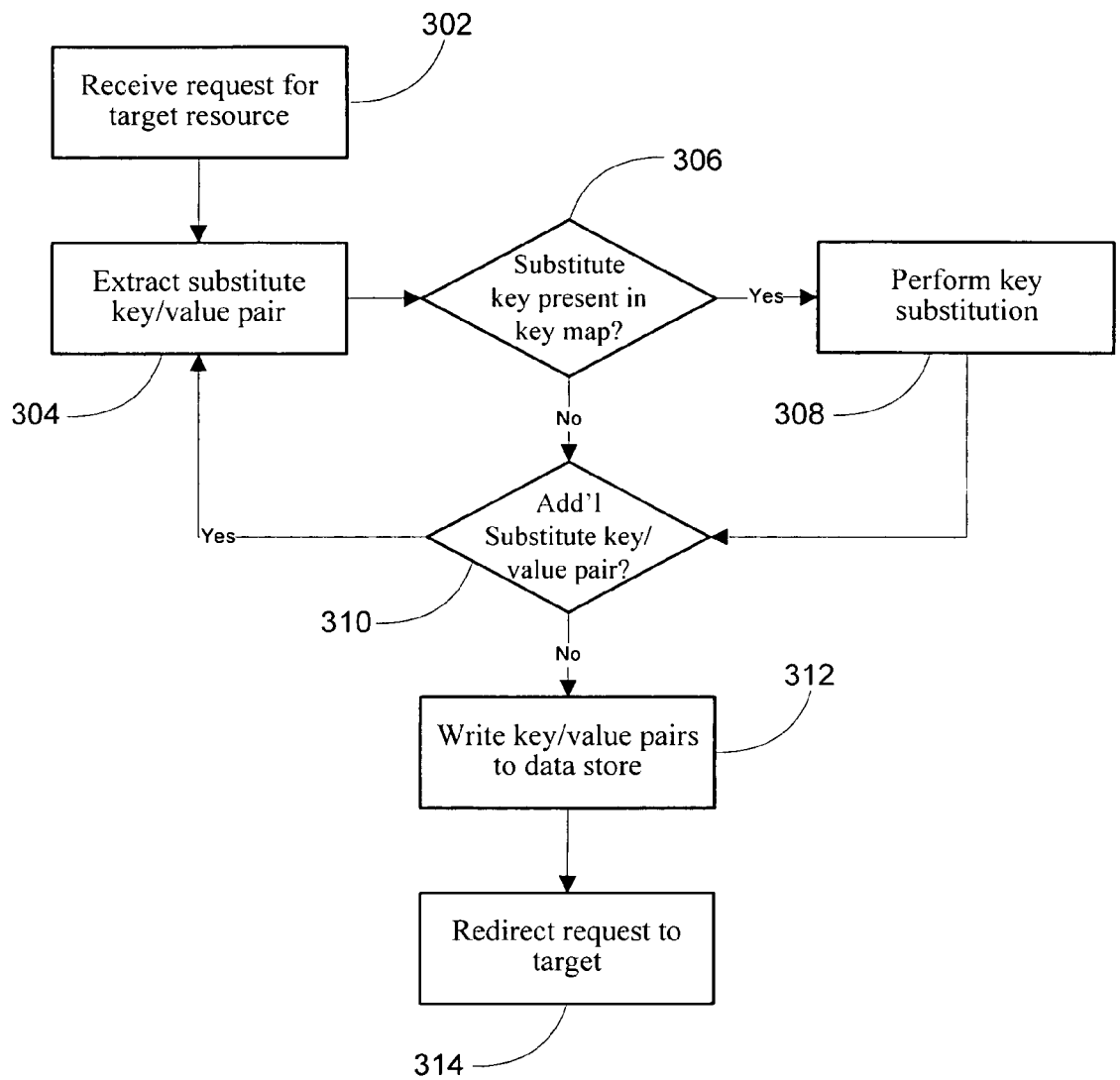
FIG. 3 is a flow diagram illustrating a process for decompressing one or more keys encoded into a URL according to one embodiment of the present invention.

One embodiment of method for decompressing or decoding one or more keys encoded into a link to a content item is illustrated in the flow diagram of FIG. 3. According to one embodiment, the process begins with the receipt of a request for a target resource, e.g., an advertisement clicked by a client, step 302, e.g., selecting a link associated with the advertisement provided to an affiliate serving the client. The server that receives the request, which may be a resultclick server, extracts a substitute key/value pair from the link that the client selects, step 304.

A check is performed to determine if the substitute key is present in a key map, step 306, which may include performing a check to determine if key-map compressions is utilized, e.g., checking for the presence of a compression flag or key. Where the substitute key is present in the key map, step 306, the server performs a key substitution whereby the substitute key the key associated in the key map with the substitute key replaces the substitute key in the link, step 308. Regardless of whether the check at step 306 evaluates to true or false, processing continues with a check to determine if an additional substitute key/vale is encoded into the link, step 310. Where an additional substitute key/value pair is encoded into the link, the server extracts a subsequent substitute key/value pair from the link, step 304.

The server processes the substitute key/value pairs, steps 304, 306 308 and 310, replacing the substitute keys with corresponding keys from the key map. The server writes the key value pairs that are extracted from the link to a data store, step 312, which according to one embodiment is a relational database. The server redirects the client to the destination site identified by the advertisement associated by the link, step 314.

Figure 4:
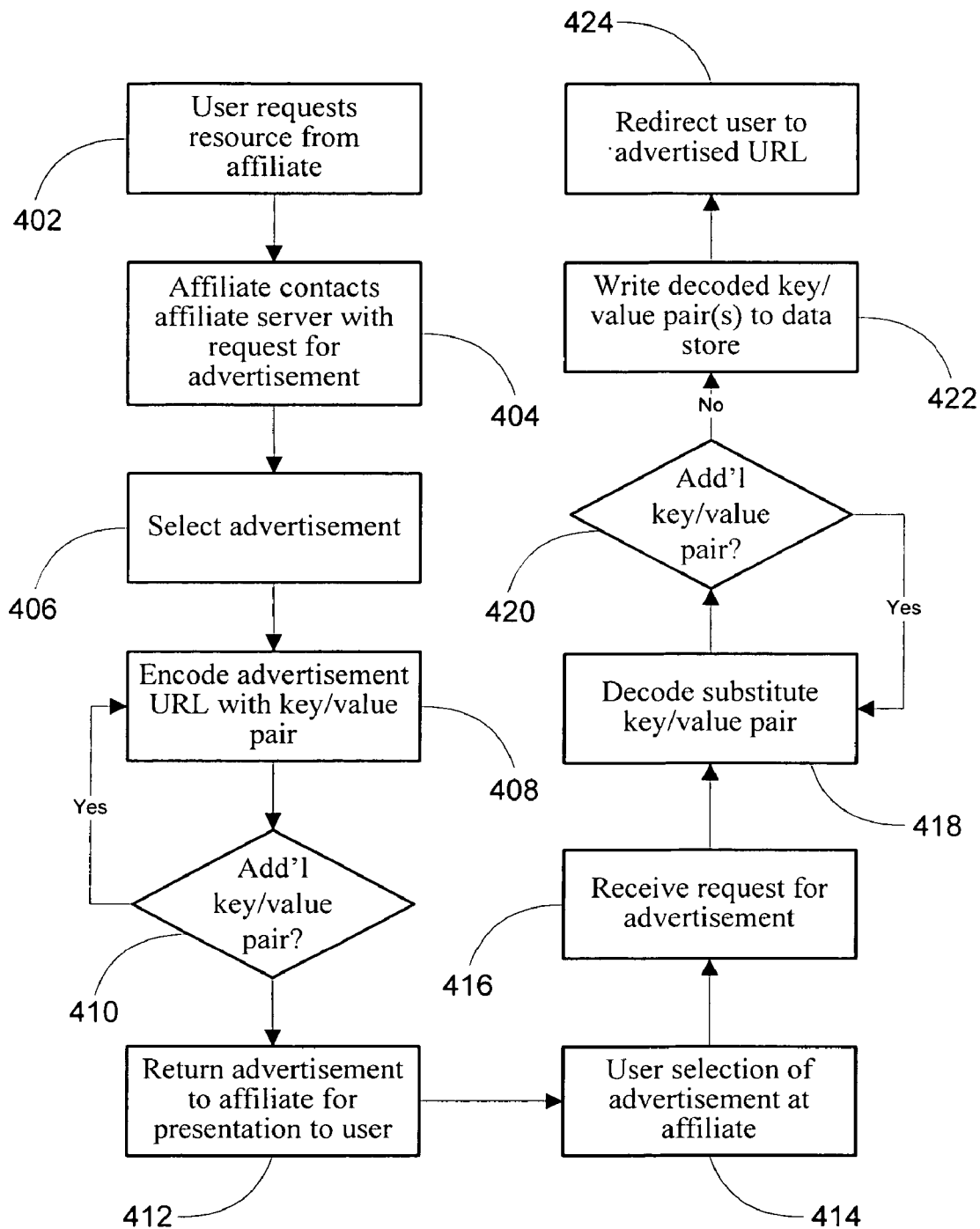
FIG. 4 is a flow diagram illustrating a process for providing one or more compressed keys encoded into a URL and decompressing the encoded keys to extract information from the URL according to one embodiment of the present invention.

FIG. 4 is a flow diagram illustrating a process for providing one or more compressed keys encoded into a URL and decompressing the encoded keys to extract information from the URL according to one embodiment of the present invention. The process of FIG. 4 begins with the user utilizing a client device issuing a request for one or more content items from an affiliate, such as a search results page from a search engine. Where the affiliate provides advertising in conjunction with a content item, the affiliate contacts an affiliate server with a request for one or more advertisements, step 404, which may comprise the affiliate passing the affiliate server information regarding the affiliate, the content items the affiliate serves or that the client is requesting, information regarding the client, information regarding the user, etc.

The affiliate server selects an advertisement, step 406, which may comprise the affiliate server selecting an advertisement on the basis of information that the affiliate provides. The server encodes the URL associated with the advertisement with information in the form of a key/value pair, step 408. The affiliate server also conducts a check to determine if additional information exists for encoding into the URL, step 410. Where additional information exists for encoding into the URL, processing returns to step 408. The process of encoding may further comprise the affiliate server reducing the size or otherwise compressing the encoded keys by replacing one or more keys with corresponding substitute keys from a key map. The affiliate server returns the advertisement and associated encoded URL (in conjunction with one or more content items that the user requests) to the affiliate for presentation to the user on the client device, step 412.

The users views the one or more content items and advertisement on the client device, which the user may utilize to select the advertisement, step 414, e.g., a web browser renders a web page and advertisement, the user using the client device to indicate a selection of the advertisement. A resultclick server receives the request from the selection of the advertisement, step 416, which decodes a given substitute key/value pair, step 418. According to one embodiment, the resultclick server utilizes a key map to identify a key that the map associates with a given substitute key, which the resultclick server uses to replace the substitute key. A check is performed to determine if an additional substitute key/value pair is encoded into the URL associated with the selection by the client, step 420, and if so, processing returns to step 418.

The decoded substitute keys, which are replaced with keys as the key map identifies, are written to a data store, step 422, which other systems may use for accounting or reconciliation purposes. The server redirects the client to the destination server that is associated with the advertisement, step 424, e.g., loading a content item associated with the advertised product or service.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method for reducing a size of one or more keys encoded into a link to a target resource, the method comprising:

receiving, in an affiliate server, from an affiliate, a request for a target resource, where the target resource includes content information associated with an advertisement;

selecting the target resources responsive to the request;

encoding a link to the target resource with one or more key/value pairs including identifying an address for the result click server;

determining if there are any additional key/value pairs for encoding into the link;

if additional key/value pairs are present, encoding the additional key/value pairs into the link;

performing a look-up operation in a key map for a key encoded in the link;

if the key is not in the key map, leaving the key encoded in the link;

if the key is in key map, substituting the key with a substitute key;

adding an additional key indicating compression of the one or more key/value pairs;

transmitting the encoded link to the affiliate;

transmitting, from the affiliate to a client device, web content and the advertisement having the encoded link associated therewith;

in response to a user selection of the encoded link, accessing the result click server identified in the link;

selecting a given key/value pair from among the one or more key/value pairs to identify a key;

locating the key in a key map to identify a substitute key;

replacing the key with the substitute key in the link;

after the user selection of the encoded link, recording information associated with the affiliate, the client device and the advertisement; and redirecting the user to the target resource.

2. The method of claim 1 wherein encoding the link comprises encoding a Uniform Resource Locator.

3. The method of claim 1 wherein identifying comprising identifying a Uniform Resource Locator for the result click server.

4. The method of claim 1 comprising writing the key/value pair to a data store.

5. The method of claim 4 wherein writing comprising writing to a relational database.

6. A system for reducing a size of one or more keys encoded into a Uniform Resource Locator, the system comprising:
   an affiliate server including a processing device being operative to:
      receive from an affiliate, a request for a target resource, where the target resource includes content information associated with an advertisement;
      select the target resources responsive to the request
      encode a link to the target resource with one or more key/value pairs including identifying an address for a result click server;
      determine if there are any additional key/value pairs for encoding into the link;
      if additional key/value pairs are present, encode the additional key/value pairs into the link;
      perform a look-up operation in a key map for a key encoded in the link;
      if the key is not in the key map, leave the key encoded in the link;
      if the key is in key map, substitute the key with a substitute key;
      add an additional key indicating compression of the one or more key/value pairs;
      transmitting the encoded link to the affiliate;
   the affiliate, including a processing device, operative to transmit to a client device web content and the advertisement having the encoded link associated therewith; and
   the result click server, including a processing device, in response to a user selection of the encoded link, operative to:
      select a given key value pair from among the one or more key/value pairs to identify a key;
      locate the key in a key map to identify a substitute key;
      replace the key with the substitute key;
      recording information associated with the affiliate, the client device and the advertisement; and
      redirecting the user to the target resource.

7. The system of claim 6 wherein the link comprises a Uniform Resource Locator that identifies an address for a target resource.

8. The system of claim 6 wherein the target resource comprises an advertisement for a product or service.

9. The system of claim 6 wherein the address for the result click server comprises a Uniform Resource Locator.

10. The system of claim 6 wherein the result click server is operative to write the key value pair to a data store.

11. The system of claim 10 wherein the data store comprises a relational database.

* * * * *